(12) United States Patent
Kwasny et al.

(10) Patent No.: US 7,670,659 B2
(45) Date of Patent: Mar. 2, 2010

(54) SUBSTRATE MARKING USING ENCAPSULATED MATERIALS

(75) Inventors: David M Kwasny, Corvallis, OR (US); Makarand P. Gore, Corvallis, OR (US); Andrew L. Van Brocklin, Corvallis, OR (US); William Dorogy, Newburyport, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1240 days.

(21) Appl. No.: 11/102,945

(22) Filed: Apr. 11, 2005

(65) Prior Publication Data

US 2006/0228515 A1 Oct. 12, 2006

(51) Int. Cl.
*B32B 3/02* (2006.01)
(52) U.S. Cl. ............... 428/64.1; 428/64.4; 428/64.8; 430/270.14
(58) Field of Classification Search ............ 428/64.1, 428/64.4, 64.8; 430/270.14
See application file for complete search history.

(56) References Cited

U.S. PATENT DOCUMENTS

| 4,529,992 | A | | 7/1985 | Ishida et al. |
| 4,576,891 | A | * | 3/1986 | Adair et al. ............... 430/138 |
| 4,806,446 | A | * | 2/1989 | Hatta et al. ............... 430/138 |
| 4,981,834 | A | * | 1/1991 | Sakojiri et al. ............ 503/204 |
| 5,196,297 | A | | 3/1993 | Dombrowski, Jr. et al. |
| 6,037,093 | A | * | 3/2000 | Hattori ..................... 430/138 |
| 6,436,600 | B1 | | 8/2002 | Suzuki et al. |
| 6,649,311 | B1 | * | 11/2003 | Shirley et al. .............. 430/15 |
| 2003/0108708 | A1 | | 6/2003 | Anderson et al. |
| 2003/0179679 | A1 | * | 9/2003 | Morishima ............... 369/108 |
| 2004/0180284 | A1 | | 9/2004 | Bhatt et al. |

FOREIGN PATENT DOCUMENTS

| JP | 62-191194 A | 2/1988 |
| JP | 62-208986 A | 2/1988 |

* cited by examiner

Primary Examiner—Elizabeth Mulvaney

(57) ABSTRACT

Substrates, coatings and methods for marking substrates using the coatings. The substrate contains a coating of encapsulated marking materials. Capsules of the encapsulated marking materials are designed to preferentially absorb a predetermined wavelength of light or range of wavelengths of light. The capsules contain color chemistry capable of activation by the predetermined wavelength of light or range of wavelengths of light for the generation of a color response. By utilizing capsules of differing color chemistries, such substrates are capable of multi-color image generation.

20 Claims, 3 Drawing Sheets

SUBSTRATE MARKING USING ENCAPSULATED MATERIALS

BACKGROUND

Optical discs, such as CDs and DVDs, have become immensely popular for the storage of data, music, pictures, videos, etc. A growing number of people are creating or "burning" their own discs. While commercially-produced discs often have full-color graphics printed on a non-data surface of a disc, home-produced discs or low-budget commercial discs are often labeled by hand as the equipment to transfer images to the discs can be quite expensive. Common solutions include writing on the disc by hand or printing a label and then applying the label to the disc. In recent years, the significant increase in the use of optical discs for data storage by consumers has increased the demand to provide customized labels to reflect the content of the optical disc.

Hewlett-Packard Company, Palo Alto, Calif., USA has disclosed LightScribe Direct Disc Labeling technology for printing images directly onto media and other surfaces. In the case of optical discs, this technology can be used to print images directly onto the discs using the same drive that is used to burn the data onto the discs. After burning the data onto the disc, the user removes the disc and reinserts it into the drive upside down to use the drive's laser to selectively illuminate portions of the disc. The laser activates a chemical reaction in the disc's coating to produce a color change. Currently, this technology delivers monochromatic images.

For the reasons stated above, and for other reasons stated below that will become apparent to those skilled in the art upon reading and understanding the present specification, there is a need in the art for alternative methods and apparatus for providing multi-color imaging suitable for use on discs.

DETAILED DESCRIPTION

Figure 1:
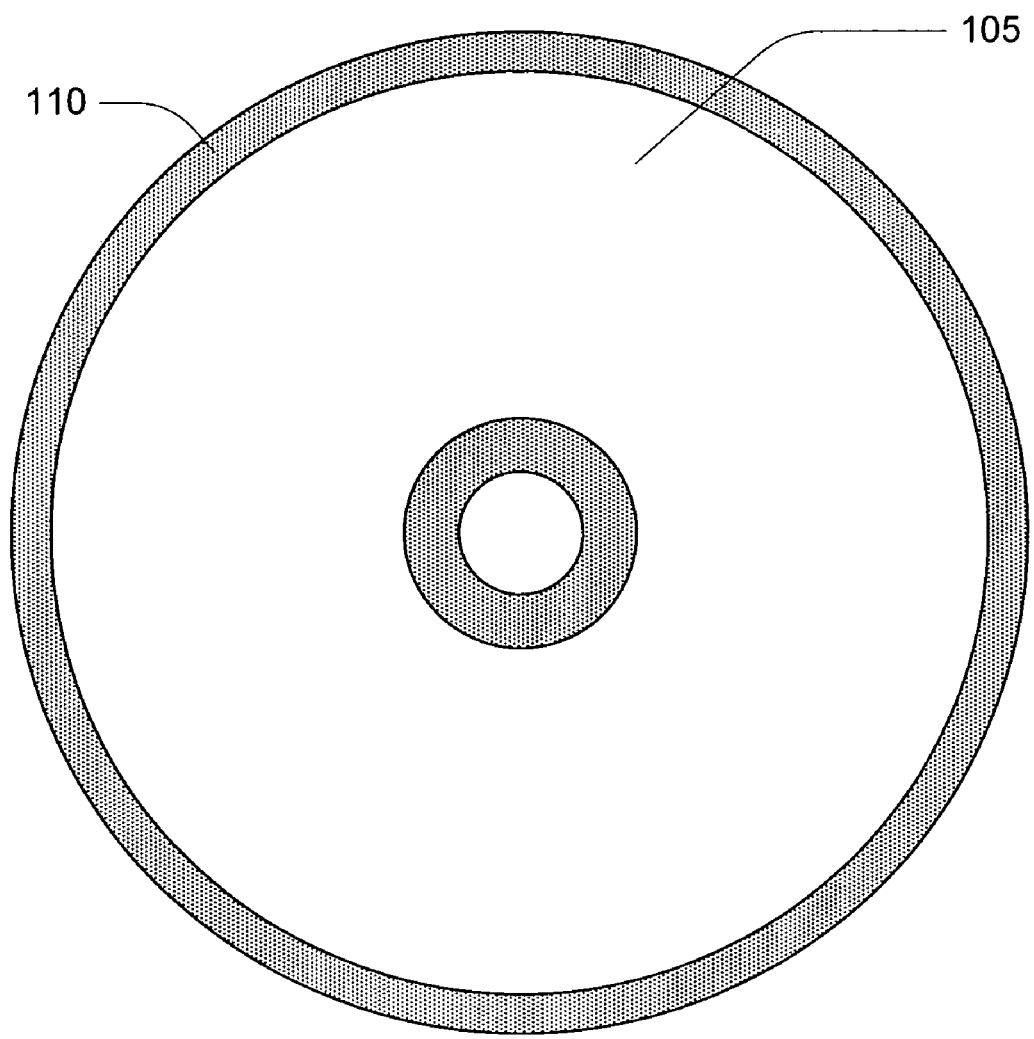
FIG. 1 is a view of a substrate in accordance with an embodiment of the invention.

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

The various embodiments utilize one or more encapsulated materials, such as microencapsulated marking materials, to facilitate marking of surfaces of products or media, such as CDs or DVDs. In one embodiment, the microcapsule walls or its contents are designed to absorb a specific radiation of light for activation of their associated color chemistry to produce a corresponding desired color. Tuning of the microcapsule contents or walls is done by incorporation of a radiation absorber in the contents or wall material of the capsules. In another embodiment, the materials contained in the wall are also composed of a radiation absorber and a specific color forming material. For a further embodiment, the contents of a microcapsule includes a color forming material and a radiation absorber. For such embodiments, the microcapsule wall may act as a thermal buffer between microcapsules of differing color chemistry. The various embodiments allow for image-wise development of desired color pixels using a specific radiation corresponding to a wavelength of the absorber associated with a specific color former in the microcapsules. Therefore, multicolor imaging is possible in one layer, and by activation of any desired color within the pixel area at the location of choice on the surface. This facilitates a reduced need for spatial positioning or dithered addressing of pixels.

Prior solutions for marking media have included inkjet printing directly onto a media surface or by printing a label for application to the media surface. Other solutions include dye-sub or thermal transfer systems. However, each of these solutions generally requires separate printers and supplies beyond the media intended for marking.

Other solutions include the generation or coating of multiple color forming layers activated by separate lasers. The individual color forming layers are designed to preferentially absorb a mutually exclusive specific wavelength or a range of wavelengths of light and are separated from each other by a thermal insulator. By applying a laser of a corresponding wavelength, a single color forming layer may be activated. In this type of system, the upper layers must be invisible to the wavelengths corresponding to lower layers in order to insure the activation of only the target laser. In addition, energy requirements may be high due to energy dissipation of layers above the target layer.

In the various embodiments, encapsulated materials may be mixed together, forming a uniform and/or biased distribution of the capsules. This mixture may then be applied to or coated onto the media. When a laser or other light source is focused on the coating, those capsules with absorbers designed to the specific wavelength of radiation are activated, triggering a chemical change corresponding to a desired specific color. By tuning the absorbers for capsules of different color chemistry to different wavelengths of light, individual colors may be activated by a laser or other light source without substantially activating other colors. Furthermore, because the capsules may be dispersed in substantially a single layer, energy requirements may be reduced in that a top surface of the coating may include each of the desired color chemistries, thus eliminating the need to pass the light through overlying layers of different color chemistries as is necessary in multi-layer approaches.

A variety of lasers or other light sources, such as an LED (light-emitting diode), can be used to provide energy to the color forming compositions; currently, many such light sources are known. Those of particular interest include commercially-available devices that can be incorporated into an optical disc reading and/or writing device, particularly those in the 200 nm to 1200 nm wavelength range. However, wavelengths outside of this range can also be used in alternative embodiments. Exemplary laser types that can be used include krypton-fluoride excimer (249 nm), xenon-chloride excimer (308 nm), nitrogen gas (337 nm), organic dye in solution (300 nm to 1000 nm—tunable), krypton ion (335 nm to 800 nm), argon ion (450 nm to 530 nm), helium neon (543 nm, 632.8 nm, and 1150 nm), semiconductor GaInP family (670 nm to 680 nm), ruby (694 nm), semiconductor GaAlAs family (750 nm to 900 nm), neodymium YAG (1064 nm), semiconductor InGaAsP family (1300 nm to 1600 nm), hydrogen-fluoride chemical (2600 nm to 3000 nm), etc. In addition to the above, these and other commercially-available lasers are available having wavelengths of, e.g., 375 nm, 405 nm, 408 nm, 440 nm, 635 nm, 638 nm, 650 nm, 660 nm, 670 nm, 685 nm, 780 nm, 785 nm, 810 nm, 830 nm, 850 nm, 980 nm, 1084 nm, 1310 nm, and 1550 nm, among others. These laser types and others are useable in accordance with the various embodiments, provided the light source is capable of providing sufficient energy to cause the desired color change, which is dependent upon the specific color chemistry chosen.

As an example of one embodiment, first capsules containing a 980 nm absorber and yellow color former chemistry can be used to produce yellow color upon activation and second capsules containing a 780 nm absorber and cyan color forming chemistry can be used to produce cyan color upon activation. If a laser having a wavelength of 980 nm is directed at a coating containing the first and second capsules, a yellow color may be produced from first capsules irradiated by the laser without activating the second capsules similarly irradiated. Furthermore, a 780 nm radiation pulse may be used to produce a cyan color from the second capsules irradiated by the laser without activating the first capsules similarly irradiated. Additional capsules designed to different wavelengths may be used to produce further colors.

The capsules are designed to preferentially absorb specific radiation wavelengths through the incorporation of radiation absorbers in the capsules. Suitable radiation absorbers can be selected from a number of radiation absorbing materials. The radiation absorber may be substantially inert with respect to the color chemistry. Alternatively, the radiation absorber may be one or more components of the color chemistry. Similarly, the radiation absorber may be a component of the capsule walls and/or a component of the encapsulated material.

In one embodiment for example, capsules of a first color chemistry are designed to absorb a range of wavelengths that includes infrared radiation from about 720 nm to about 900 nm. Common CD-burning lasers have a wavelength of about 780 nm. In a further embodiment, capsules of a second color chemistry are designed to absorb a range of wavelengths from about 600 nm to about 720 nm and more specifically at about 650 nm. In a still further embodiment, capsules of a third color chemistry are designed to absorb radiation in the range from about 300 nm to about 600 nm. In particular, radiation sources such as the lasers used in certain DVD and laser disc recording equipment emit energy at a wavelength of about 405 nm.

Encapsulation is a process of enclosing small droplets of liquids, solids or gases within a thin film or coating. In typical uses, the material within the coating can then be released upon disintegration or rupture of the coating. Encapsulation processes are well understood and have been used extensively in the food and cosmetic industries for quite some time. A popular example of use of an encapsulated coating is a sample card containing an encapsulated fragrance. Scraping a fingernail or other device across the coating breaks the capsules, thus releasing the fragrance. A variety of processes are known for forming such capsules, such as various spray drying and emulsion processes. However, the invention is not limited to a particular encapsulation process.

For various embodiments, the capsules may be thermally disrupted by their associated radiation absorption characteristics, or they may simply increase in temperature due to the absorption. The capsules may contain all of the chemistry necessary to produce their associated color. Upon heating, the color chemistry may be activated, thus producing its associated color. Such embodiments can be used with or without disruption of the capsule walls. Alternatively, the capsules can contain a portion of the chemistry necessary to produce their associated color, with the remaining chemistry located outside the capsule walls. For example, a color forming compound may be contained within a capsule and a color developer may be contained in spaces between capsules such that the capsule wall separates the color forming compound and its developer. Upon disruption of the capsule, its contents could then mix with the developer, resulting in the color forming reaction. In further embodiments, the color chemistries are photo-initiated dye systems, i.e., activated merely by exposure to the appropriate light source, substantially without regard to thermal changes.

Thermally activated dye systems are known and the various embodiments are not limited to a specific chemistry or system. Some specific examples of thermally-activated dye systems can be found in U.S. patent application Ser. No. 11/092,407 of Makarand Gore filed Mar. 29, 2005 (now U.S. Pat. No. 7,270,944, issued Sep. 18, 2007) and titled, "COMPOSITIONS, SYSTEMS, AND METHODS FOR IMAGING," which is commonly assigned and incorporated herein by reference in its entirety. For one embodiment, a capsule is filled with a formulation including a matrix, an absorber, a color leucozine dye, an acidic activator and an image stabilizer. Such chemistries are based on a thermochromic chemical reaction that can yield a fast, high contrast color change. In such a system, color is generated by melting and diffusing the leucozine dye into the matrix and activator. Photo-initiated dye systems may also be used.

Capsules in accordance with the various embodiments are preferably smaller than a desired pixel size for use in producing an image. For example, it is preferable that each pixel be capable producing each color that might be desired. If cyan, magenta and yellow are desired in a resulting image, either individually or in combination, each pixel of that image should contain at least one capsule capable of producing each of those colors. Higher resolution may be obtained by utilizing capsule sizes that facilitate higher numbers of capsules of each color contained in each pixel. For example, the microcapsules might range in size from 100 nm to 80 µm.

The capsules may further be sized such that they are smaller than the beam size of the light used to irradiate them. In this manner, multiple capsules will be subjected to the beam when it hits the surface, thereby increasing the amount of capsules with the matching wavelength, or increasing the probability that one with the matching wavelength will be activated. The capsules may be mixed with either uniform proportions of each of the different color formulations, or non-uniform proportions, depending upon the desired color gamut response. That is, if a larger amount of color chemistry is required to produce a desired response, that color chemistry could occupy a larger proportion of the overall mixture. Similarly, the capsules may be the same size, or vary in size, depending upon the desired resolution or color gamut response desired.

The walls of the capsules may be made of a variety of materials, such as waxes, polymers or resins, and may include one or more of the formulation components to facilitate more efficient reaction. The capsule walls may further act as an insulator, eliminating or reducing the activation of adjacent capsules due to heat generated by the activation of the target capsule. To create a final coating material, capsules may be added to other matrix material and/or binders.

FIG. 1 is a view of a substrate, such as media 100, in accordance with an embodiment of the invention. The media 100 is depicted as a computer-readable media disc, such as a CD or DVD. Specific and other examples of computer-readable media discs include CD-R, CD-RW, DVD-R, DVD+R, DVD-RAM, DVD-RW, DVD+RW, BLU-RAY discs, etc. Although the various embodiments are described in relation to computer-readable media, the concepts described herein can be used on any media type, e.g., sheet stock. A coating 105 is applied to a label surface 110 of the media 100. The coating 105 includes encapsulated marking material in accordance with an embodiment of the invention.

The coating 105 may be applied to label surface 110 of the media 100 in any of a variety of processes. Some common examples include spin coating, screen printing, spray coating. It is noted that screen printing is commonly used in the manufacture of computer-readable media, such as CDs and DVDs. The coating 105 may extend over only a portion of the label surface 110 of the media 100, such as depicted in FIG. 1, or it may extend over the entire label surface 110.

Figure 2A:
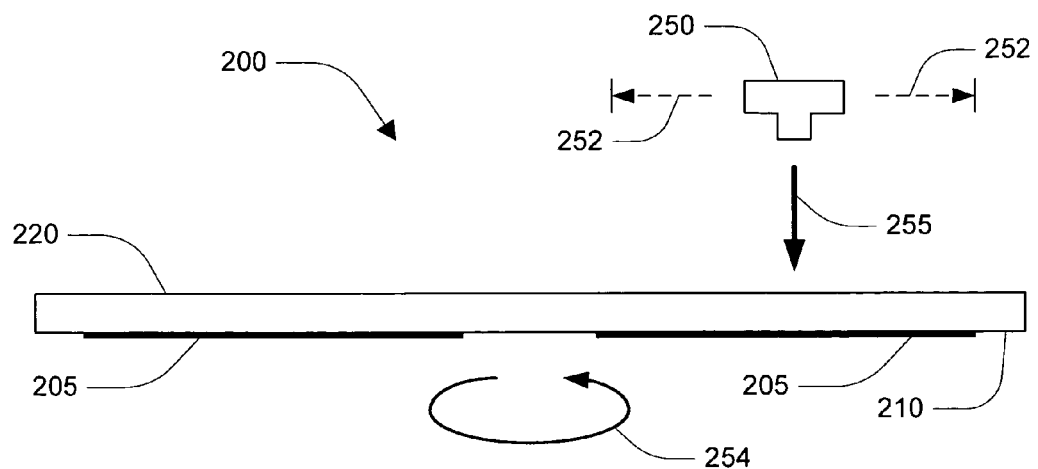
FIGS. 2A-2B are side views of media demonstrating data access and printing in accordance with embodiments of the invention.
Figure 2B:
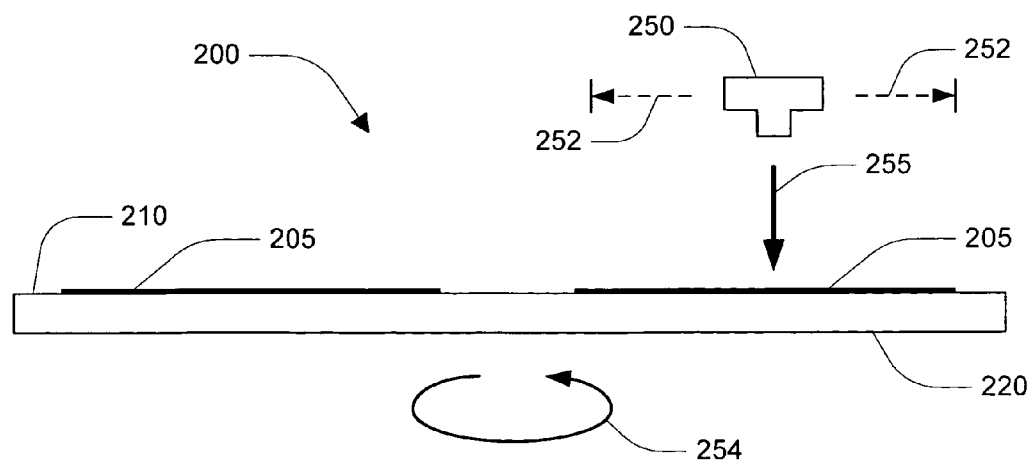

FIGS. 2A-2B are side views of computer-readable media 200 demonstrating data access and printing in accordance with embodiments of the invention. Data access can include reading and/or writing to the computer-readable media 200. Such access can occur in typical media access device, such as CD and DVD readers/writers. Some DVD writers contain more than one laser to facilitate data access according to multiple different industry standards. The embodiments of FIGS. 2A-2B will be described in relation to a DVD writer having two light sources or lasers, e.g., one having a wavelength of approximately 650 nm and one having a wavelength of approximately 780 nm. Each light source is utilized to produce one color response. It should be apparent that existing media access devices could be modified to include additional light sources to facilitate printing in additional colors.

In FIG. 2A, the media 200, such as a DVD recordable disc, is inserted into the DVD writer with its data surface 220 facing the light source, such as laser 250, to facilitate data access. Laser 250 will be used to conceptually represent each of the lasers contained in the DVD writer, although only one laser typically is used at any one time during data access. The media 200 is rotated by drive 254 while laser light 255 is directed toward the data surface 220. By selectively pulsing the laser light 255 while the media 200 is rotated, and by moving the laser 250 in relation to the data surface 220 as shown by lines 252, the laser 250 can be made to selectively irradiate portions of the data surface 220. For data recording, the selective irradiation is used to burn a series of dimples into the data surface 220 to represent binary data values. In this manner, data can be recorded in the data surface 220. This process is well understood for the burning of DVDs. The motion of the laser 250 relative to the data surface 220 is generally limited. With the data surface 220 facing the laser 250, a label surface 210, opposite the data surface 220, is facing away from the laser 250. Label surface 210 includes a coating 205 having encapsulated marking materials in accordance with the various embodiments.

In FIG. 2B, the media 200 is inserted into the DVD writer or other media access device such that its label surface 210 is facing the laser 250 to facilitate printing an image on the label surface 210. The media 200 is rotated by drive 254 while laser light 255 is directed toward the label surface 210. By selectively pulsing the laser light 255 while the media 200 is rotated, and by moving the laser 250 in relation to the label surface 220 as shown by lines 252, the laser 250 can be made to selectively irradiate portions of the coating 205. As described earlier, irradiation of the label surface 210 containing a coating 205 having encapsulated marking materials in accordance with the various embodiments can be used to create colors in the irradiated portions. By irradiating the coating 205 of label surface 210 in this manner using lasers 250 having two different wavelengths, designs having at least two different colors can be produced on the label surface 210. As is well known in the art of printing, mixing of two different colors can also result in a series of blended colors, facilitating far more than two colors in the finished image.

To facilitate full color printing, such as the utilization of cyan, yellow and magenta, a third laser 250 can be added to the media access device having a different wavelength than the first or second lasers 250. Using a label surface 210 having a white background, the blending of cyan, yellow and magenta can be used to fundamentally create any desired color on the label surface 210 ranging from white to black. Although a full-color response can be accomplished using these three colors, the various embodiments are not limited to these particular colors. Additional or alternative colors may be utilized to obtain a desired response.

Figure 3:
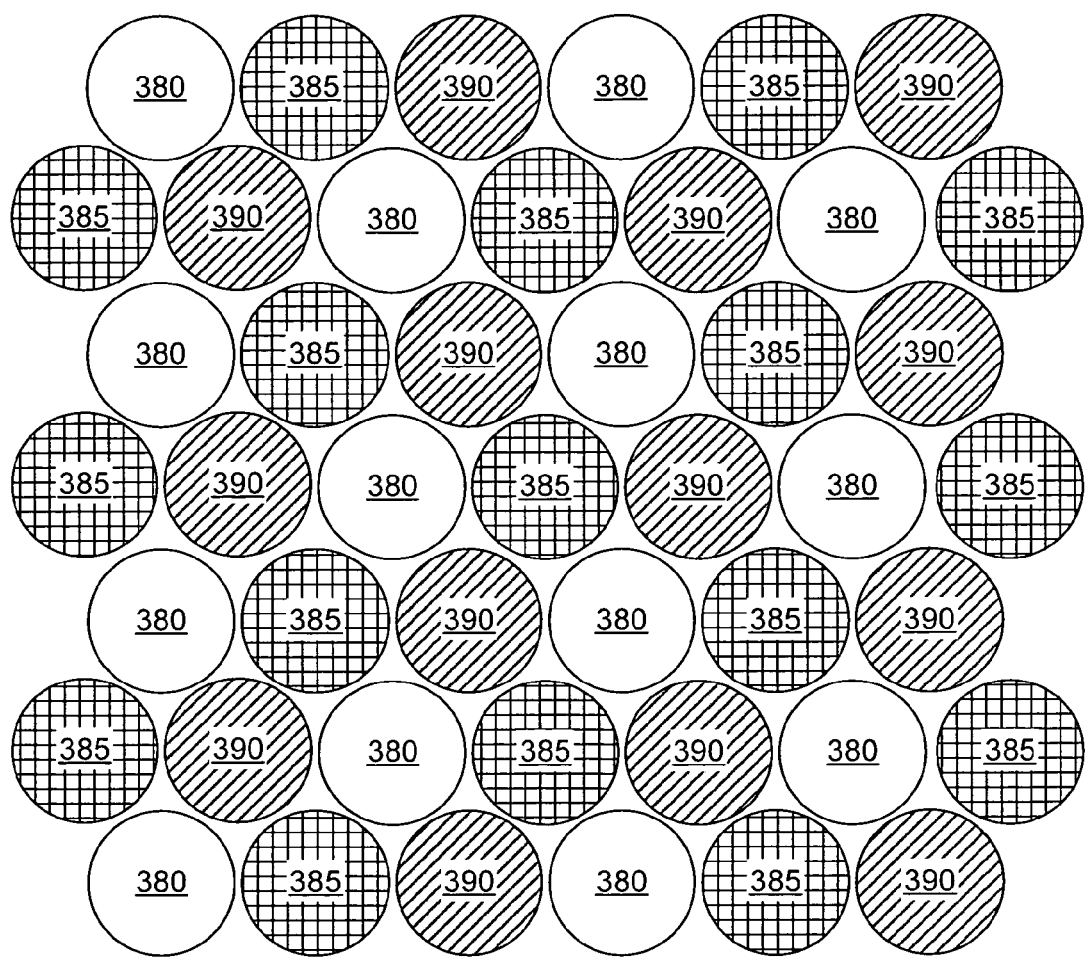
FIG. 3 is a depiction of encapsulated marking materials in accordance with an embodiment of the invention.

FIG. 3 is a depiction of encapsulated marking materials 380, 385 and 390 in accordance with an embodiment of the invention. For one embodiment, encapsulated marking material 380 includes a color system for a first color, such as cyan; encapsulated marking material 385 includes a color system for a second color, such as yellow; and encapsulated marking material 390 includes a color system for a third color, such as magenta. FIG. 3 may conceptually represent a single pixel of the label surface in accordance with the various embodiments. Although FIG. 3 shows a regular and uniform distribution of encapsulated marking materials, it is recognized that such a regular and uniform distribution is unlikely in standard industrial processing. However, if the capsule sizes are chosen such that each pixel has a high probability of containing each type of color chemistry, it is generally irrelevant whether the distribution is perfectly uniform.

Each of the encapsulated marking materials 380, 385 and 390 is designed to respond to a different wavelength, or ranges of wavelengths, of light. Where the encapsulated marking materials are responsive to ranges of wavelengths of light, the ranges need not be mutually exclusive. However, to selectively activate only one color response, at least a portion of the ranges must be mutually exclusive. Thus, by selectively irradiating the pixel using laser light of wavelengths corresponding to each respective encapsulated marking material, the pixel can be made to exhibit different colors. Furthermore, because variations will occur within each group of encapsulated marking materials 380, 385 and 390, changes in irradiation length might be used to produce weaker or stronger color responses in that individual capsules may need higher levels of irradiation before activation occurs, i.e., it may take more irradiation before the capsule temperature increases sufficiently for activation or wall disruption.

As each color is desired, the appropriate laser is directed to the surface of the media or panned across the surface of the media, activating the target color. Multiple passes by multiple lasers can activate each target color, generating a full color image. The various embodiments facilitate a reduced reliance upon high precision laser positioning to achieve color. Furthermore, the various embodiments facilitate a reduced reliance upon coating development that is transparent to various laser wavelengths.

Although specific embodiments have been illustrated and described herein it is manifestly intended that the invention be limited only by the following claims and equivalents thereof.

What is claimed is:

1. An optical disc, comprising:
 a data surface for recording data; and
 a label surface opposite the data surface and having thereon
  a coating of encapsulated marking materials containing
   at least a plurality of first capsules, wherein the first capsules comprise at least one first radiation absorber to preferentially absorb at least one first predetermined wavelength of light and wherein the marking materials of the first capsules are capable of activation by the at least one first predetermined wavelength of light for the generation of a first color response on the label surface;

wherein the coating further contains a plurality of second capsules, wherein the second capsules comprise at least one second radiation absorber to preferentially absorb at least one second predetermined wavelength of light different than the at least one first predetermined wavelength of light and wherein the marking materials of the second capsules are capable of activation by the at least one second predetermined wavelength of light for the generation of a second color response on the label surface;

wherein the at least one first predetermined wavelength of light is a wavelength of light further capable of recording data in the data surface.

2. The optical disc of claim 1, wherein the first capsules are further designed to preferentially absorb a first range of wavelengths of light.

3. The optical disc of claim 1, wherein the optical disc is selected from the group consisting of CD-R, CD-RW, DVD-R, DVD+R, DVD-RAM, DVD-RW, DVD+RW and BLU-RAY discs.

4. The optical disc of claim 1, wherein the second capsules are further designed to preferentially absorb a second range of wavelengths of light.

5. The optical disc of claim 4, wherein the first capsules are further designed to preferentially absorb a first range of wavelengths of light and wherein at least a portion of the second range of wavelengths of light is mutually exclusive from a portion of the first range of wavelengths of light.

6. The optical disc of claim 1, wherein the coating further contains a plurality of third capsules, wherein the third capsules comprise at least one third radiation absorber to preferentially absorb at least one third predetermined wavelength of light different than the at least one first and the at least one second predetermined wavelengths of light and wherein the marking materials of the third capsules are capable of activation by the at least one third predetermined wavelength of light for the generation of a third color response.

7. The optical disc of claim 6, wherein the third capsules are further designed to preferentially absorb a third range of wavelengths of light.

8. The optical disc of claim 7, wherein the first capsules are further designed to preferentially absorb a first range of wavelengths of light, wherein the second capsules are further designed to preferentially absorb a second range of wavelengths of light, and wherein the first, second and third ranges of wavelengths of light each have at least a portion of their wavelengths that are mutually exclusive from a portion of each of the remaining ranges of wavelengths of light.

9. A computer-readable media, comprising:
a label surface having a coating containing at least a plurality of first capsules and a plurality of second capsules;
wherein the first capsules contain a first color chemistry for producing a first color response;
wherein the first capsules contain a first radiation absorber;
wherein the first color chemistry is capable of activation when a light source having a first wavelength associated with the first radiation absorber is directed at one or more of the first capsules;
wherein the second capsules contain a second color chemistry for producing a second color response;
wherein the second capsules contain a second radiation absorber;
wherein the second color chemistry is capable of activation when a light source having a second wavelength associated with the second radiation absorber is directed at one or more of the second capsules;
wherein the computer-readable media is a laser-recordable media; and
wherein the light source includes a laser used for recording data onto the media.

10. The computer-readable media of claim 9, further comprising:
wherein the coating further contains a plurality of third capsules, the third capsules containing a third color chemistry for producing a third color response;
wherein the third capsules contain a third radiation absorber; and
wherein the third color chemistry is capable of activation when a light source having a third wavelength associated with the third radiation absorber is directed at one or more of the third capsules.

11. The computer-readable media of claim 10, wherein the first, second and third color chemistries produce cyan, yellow and magenta color responses, respectively.

12. A method of generating an image on a computer-readable media, comprising:
activating two or more encapsulated marking materials contained on a surface of the computer-readable media to generate two or more color responses on the surface using at least one means for data access of the computer-readable media;
wherein the means for data access includes means for data access using more than one wavelength of laser light;
wherein at least one wavelength of laser light of the means for data access is capable of recording data onto the computer-readable media; and
wherein each of the two or more encapsulated marking materials is activated using a different wavelength of laser light of the means for data access.

13. A method of using a computer-readable media, comprising:
placing the media in a data access device having a first surface facing a first light source;
writing data to the media using the first light source;
placing the media in the data access device having a second surface facing the first light source, wherein the second surface is opposite the first surface and wherein the second surface is coated with at least a plurality of first encapsulated marking materials and a plurality of second encapsulated marking materials;
selectively irradiating a first portion of the second surface of the media using the first light source, causing capsules of the first encapsulated marking material in the irradiated first portion to change color, thereby generating a first color response; and
with the second surface facing the first light source, selectively irradiating a second portion of the second surface of the media using a second light source, causing capsules of a second encapsulated marking material in the irradiated second portion to change color, thereby generating a second color response.

14. The method of claim 13, wherein the irradiated first portion and the irradiated second portion cover at least some of the same area of the second surface, thereby permitting mixing of the first and second color responses.

15. The method of claim 13, further comprising:
with the second surface facing the first light source, selectively irradiating a third portion of the second surface of the media using a third light source, causing capsules of a third encapsulated marking material in the irradiated third portion to change color, thereby generating a third color response.

16. The method of claim 15, wherein the irradiated first portion, the irradiated second portion and the irradiated third portion cover at least some of the same area of the second surface, thereby permitting mixing of the first, second and third color responses.

17. The optical disk of claim 1, wherein at least one first radiation absorber is contained in wall material of the first capsules.

18. The optical disk of claim 1, wherein at least one first radiation absorber is contained in contents of the first capsules.

19. The optical disk of claim 1, wherein at least one second radiation absorber is contained in wall material of the second capsules.

20. The optical disk of claim 1, wherein at least one second radiation absorber is contained in contents of the second capsules.

* * * * *